(12) United States Patent
Kanai

(10) Patent No.: US 6,295,259 B1
(45) Date of Patent: Sep. 25, 2001

(54) METHOD AND APPARATUS FOR DIGITIZING A SIGNAL READ FROM A DATA STORAGE MEDIUM INTO A BINARY VALUE

(75) Inventor: Toshio Kanai, Moriyama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,898

(22) Filed: May 20, 1999

(30) Foreign Application Priority Data

May 20, 1998 (JP) .................................. 10-138390

(51) Int. Cl.⁷ ..................................................... G11B 5/09
(52) U.S. Cl. ..................................... 369/47.35; 369/59.12; 369/59.17

(58) Field of Search .............................. 369/47.15, 47.28, 369/47.35, 53.31, 53.34, 53.35, 59.1, 59.12, 59.17, 59.2, 59.21, 124.15; 360/32, 51

(56) References Cited

U.S. PATENT DOCUMENTS 5,204,848 * 4/1993 Cardero et al. ............... 369/59.17 X
5,278,702 * 1/1994 Wilson et al. .................... 360/51

\* cited by examiner

*Primary Examiner*—Paul W. Huber
(74) *Attorney, Agent, or Firm*—G. Marlin Knight

(57) ABSTRACT

To more precisely digitize a signal read from a data storage medium into a binary value to reduce the rate of occurrence of bit error in reproduction. A phase difference of the intersecttion between a signal read from a data storage medium and a slice signal is evaluated to select a probable time cell in which the intersection should be contained for more precisely digitizing the read signal into a binary value.

15 Claims, 4 Drawing Sheets

METHOD AND APPARATUS FOR DIGITIZING A SIGNAL READ FROM A DATA STORAGE MEDIUM INTO A BINARY VALUE

FIELD OF THE INVENTION

This invention generally relates to a method for reducing a bit error rate which occurs when data is reproduced from a medium in which data is stored and, in particular, to an apparatus for precisely digitizing a signal read from a data storage medium into a binary value.

BACKGROUND OF THE INVENTION

As a storage medium of information (data) such as a document, an image and a sound, storage media such as a hand disk (HD), a digital video disk (DVD), a magneto-optical disk (MO), a compact disk (CD) and a laser disk (LD) have been developed and the capacity thereof have been increased.

When data is reproduced from a medium such as an optical disk in which data is stored, it is necessary to digitize a signal read from the medium into information of a bit string comprising "1s" and "0s" (digital). FIG. 1 is a diagram showing a method (principle) of digitizing a signal read from a medium which is recorded with PWM scheme. In FIG. 1, 1 shows a signal read from the medium and 2 shows a slice level signal (hereinafter referred to as "slice signal") for digitizing into a binary value. The slice signal is normally obtained as an average of an integration of an output signal from the medium by a digital sum value circuit (DSV) which has an integration circuit. 3 shows a clock for digitizing into a binary value and is hereinafter called a "time cell" in this specification. The time cell 3 is normally determined and controlled by a phase lock loop (PLL) based on the frequency of the output signal from the medium. The time cell 3 has a fixed phase $-\pi$ to $+\pi$ as shown by a reference number 4.

In FIG. 1, a time cell containing an intersection 6 of the read signal and the slice signal 2 is a bit "1" while a time cell which does not contain an intersection is a bit "0". As such, the read signal is converted into bit string information comprising "1" and "0" as shown by the reference number 7 in FIG. 1.

The reproduced bit string information varies due to the variation of the slice level of the slice signal 2 and the width (period) of the time cell. For example, when the slice level of the slice signal is shifted upward from a position 8 where the level is supposed to originally exist to a position 9 shown by a dotted line as shown in FIG. 2, the position of the intersection with the read signal 1 is shifted forward and backward as shown by the reference number 10 and 11. As a result, the time cell in which an intersection should be contained is shifted from the position where the cell should originally exist.

Further, an error is included in the intersection between the read signal and the slice signal due to the influence of a distortion of a signal waveform by a noise. FIG. 3 is a diagram showing the influence of a variation of the slice level and a phase error (variation) of a measured value within a single time cell. In FIG. 3, the dotted line 12 indicates a shift of the phase value due to the variation of the slice level. The 3 measured values A, B and C in the intersection each has an error width 13 of the measured value. Incidentally, a correction of polarity is added to each phase error so that the error is shown only with a positive value in FIG. 3. The measured value C may shifts to the adjacent time cell beyond the phase $+\pi$ due to an error. In other words, the time cell in which the intersection should be contained is probable to be shifted. Such shift of the time cell containing the intersection similarly occurs when the width (period) of the time cell becomes larger or smaller. As a result, it is probable that the reproduced bit string information is different from the true original data.

The reproduced bit string information is then checked by an error correction circuit (ECC) to correct the error. However, the correction is not necessarily perfect. Accordingly, it would be advantageous to effect a correction corresponding to the error correction of the reproduced bit string information by some different method.

Bit string information which reproduces an "ID" and the like existing in a pre-formatted portion of an optical disk can not be corrected by an ECC. Therefore, it would be very advantageous to correct such data which can not be corrected by an ECC so as to precisely reproduce it. This is because "SM" and "VFO", etc., are normally preceding to an area (sector) where data is stored so that stored data can not be reproduced or written sector by sector unless a precise reproduction is effected.

SUMMARY OF THE INVENTION

It is an object of this invention to provide a method and an apparatus for precisely digitizing a signal read from a data storage medium into a binary value.

It is another object of this invention to provide a method and an apparatus for reproducing correct bit string information by evaluating a phase error of an intersection between a signal read from a data storage medium and a slice signal to select a time cell which is probable to contain an intersection.

It is a further object of this invention to provide a method and an apparatus for enabling the rate of occurrence of a bit error to be reduced in reproducing stored data.

This invention provides a method of digitizing a signal read from a data storage medium into a binary value comprising;

a step of obtaining a period of a time cell from the frequency of the read signal, a step of detecting an intersection between the read signal and a slice signal, a step of selecting a time cell in which said intersection is contained, a step of evaluating the probability of the selected time cell and re-selecting a time cell in which said intersection should be contained, and a step of determining that said re-selected time cell is a bit "1".

This invention also provides an apparatus for digitizing a signal read from a data storage medium into a binary value comprising;

a circuit for generating a slice signal, a level comparator for slicing the read signal using the slice signal to detect the intersection between the read signal and the slice signal, a circuit for generating and controlling a time cell, a phase comparator for selecting a time cell in which the detected intersection is contained to detect a phase difference between the center of the time cell and the intersection, and an arithmetic evaluation circuit for evaluating the probability of the time cell in which the intersection is contained using the detected phase difference to select a time cell in which the intersection should be contained.

Preferred Embodiment

Figure 1:
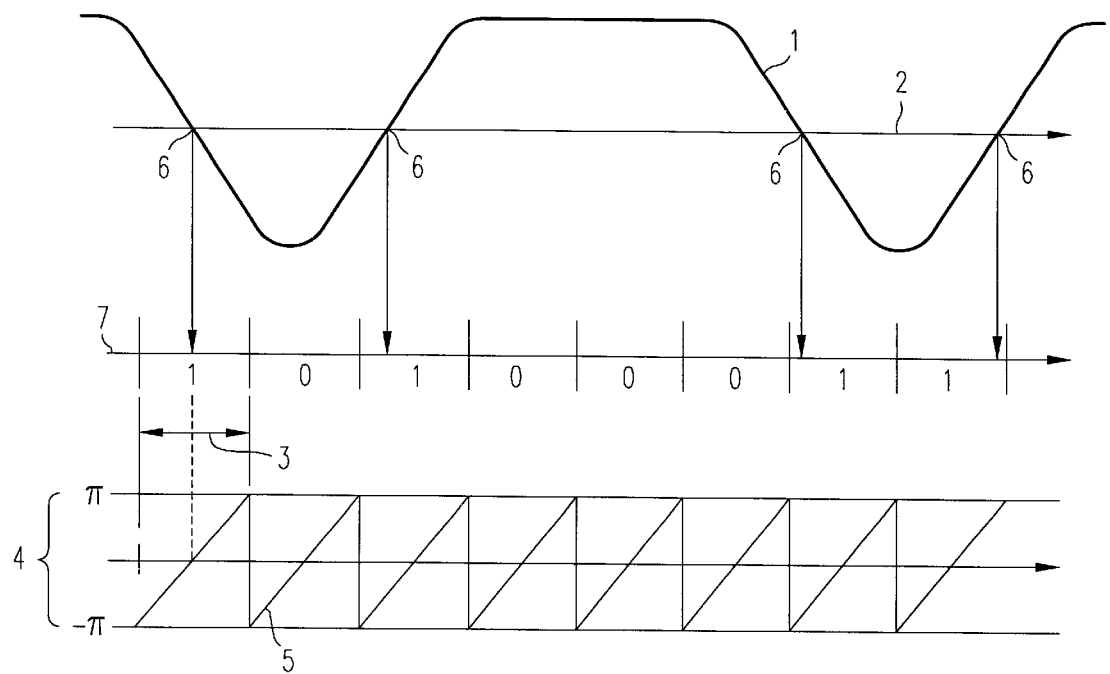
FIG. 1 is a diagram showing a method (principle) of digitizing a signal read from a data storage medium.
Figure 2:
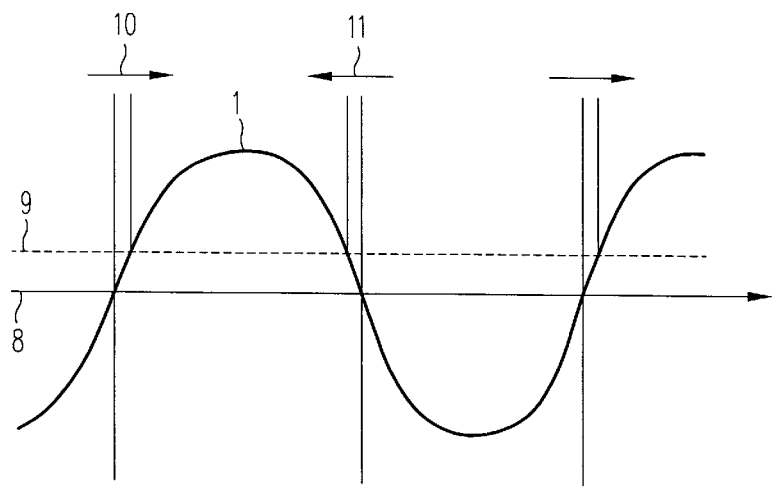
FIG. 2 is a diagram showing the manner of variation of the slice level of the slice signal.
Figure 3:
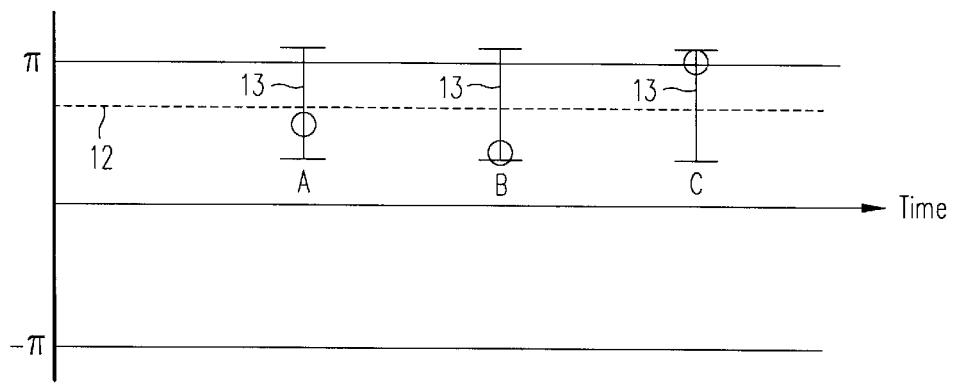
FIG. 3 is a diagram showing the influence of a variation of the slice level and a phase error (variation) of a measurement value within a single time cell.
Figure 4:
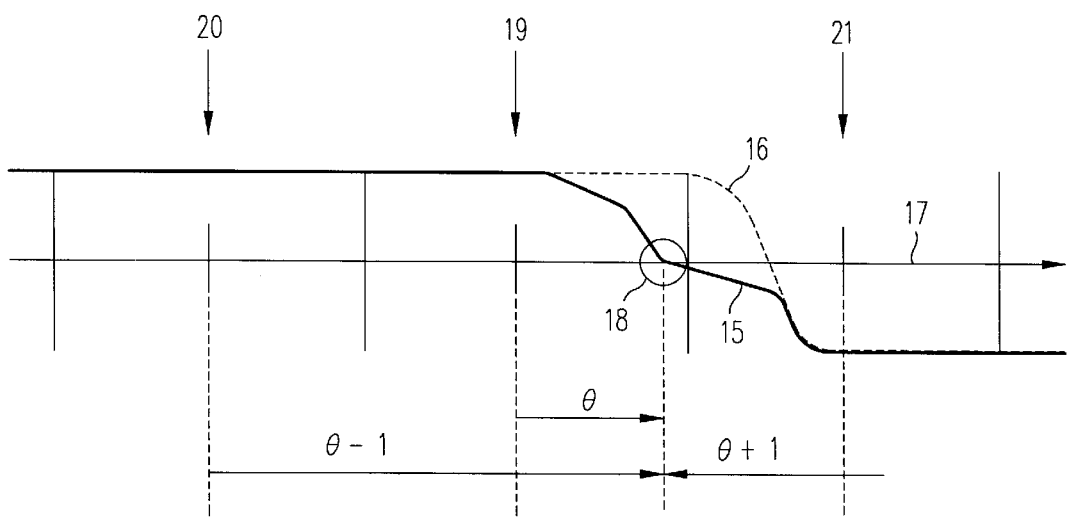
FIG. 4 is a diagram showing the relationship between the intersection of a signal read from the data storage medium and the slice signal and a time cell.

FIG. 4 is a diagram showing the relationship between a time cell and the intersection of the signal read from the storage medium and the slice signal for the purpose of explaining an embodiment of this invention. Any kind of storage media, such as a hand disk (HD), a digital video disk (DVD), a magneto-optical disk (MO, a compact disk (CD) and a laser disk (LD), may be included. FIG. 4 shows an example where the waveform of the read signal 15 is distorted relative to the read signal waveform 16 which should be inherently detected due to the influence of a noise. Due to the distortion of the read signal 15, the intersection 18 with the slice signal 17 has been shifted to the left (leading in time) of the position which it should inherently assume. The reference numbers 19, 20 and 21 show the time cells. The width of the time cell (period) is determined based on the frequency of the read signal.

It is assumed that the phase difference between the center of the time cell 19 in which the intersection 18 is contained and the intersection 18 is "θ" while the phase differences between the center of the time cells 20, 21 to the left and right of the time cell 19 and the intersection 18 are "θ−1" and "θ+1", respectively. In FIG. 4, the sign of "θ" and "θ−1" is positive while the sign of "θ+1" is negative because the intersection 18 lies to the right of the center of the time cell 19. The absolute value of the phase difference "θ+1" is less than "θ−1". It is defined that the smaller phase difference "θ+1" is φ. Conversely, it is defined that the phase difference "θ−1" is φ when "θ−1" is smaller than "θ+1".

Two straight lines L0 and L1 are defined using a least square method from the phase differences θ, φ, the value (phase difference) preceding to the immediately preceding value p(0) and the immediately preceding value (phase difference) p(1).

$$L0 = f[p(0), p(1), \theta]$$

$$L1 = f[p(0), p(1), \phi]$$

Figure 5:
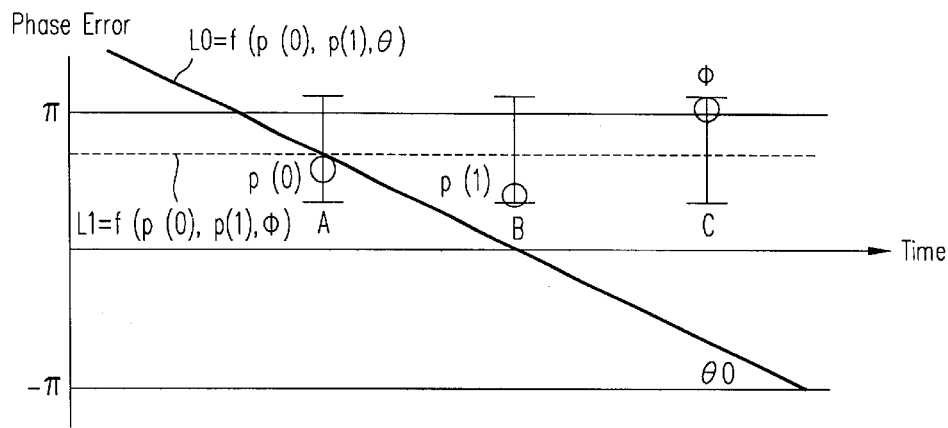
FIG. 5 is a diagram showing straight lines L0 and L1 obtained using a least square method in the method of this invention.
Figure 7:
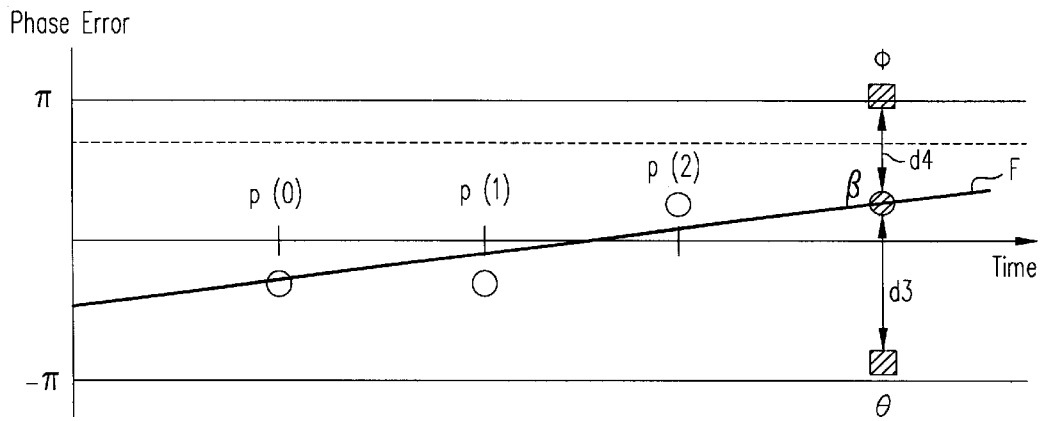
FIG. 7 is a diagram showing a straight line F obtained by the method of this invention.

FIG. 5 is a diagram showing the straight lines L0 and L1 obtained by using a least square method for the example of FIG. 4. The straight line L0 is a straight line (solid line) which is defined by 3 points p(0), p(1) and θ by using a least square method while the straight line L1 is a straight line (solid line) which is defined by 3 points p(0), p(1) and φ by using a least square method.

Using the straight lines L0 and L1, a distance D0 between the straight line L0 and the point p(1) and the distance D1 between the straight line L1 and the point p(1) are obtained. The smaller one of the distances D0 and D1 is then selected as a probable phase difference. Instead of the distances D0 and D1, a sum of the distances from the straight line L0 to the 3 points p(0), p(1) and θ may be defined as the distance D0 while a sum of the distances from the straight line L1 to the 3 points p(0), p(1) and φ may be defined as the distance D1 and then the smaller one of D0 and D1 may be similarly selected as a probable phase difference.

A time cell containing the selected phase difference is selected as a probable time cell in which the intersection should be contained. Specifically, if D0<D1, the time cell 19 having θ is selected as a probable time cell. Conversely, if D0>D1, the time cell 21 having φ ("θ+1", in the example of FIG. 4) is selected as a probable time cell. If D0=D1, a time cell containing θ is selected. As such, a probable time cell can be selected even if the phase difference exceeds π. However, a selectable (correctable) error is limited to a range of one time cell preceding and one time cell following the time cell having "θ". Finally, immediately preceding value (phase difference) p(1) is saved as a new p(0) and the selected θ or φ is saved as a new p(1) to prepare for the next evaluation. Similar selection and determination are repeated every time a new measured value of an intersection is obtained.

Figure 6:
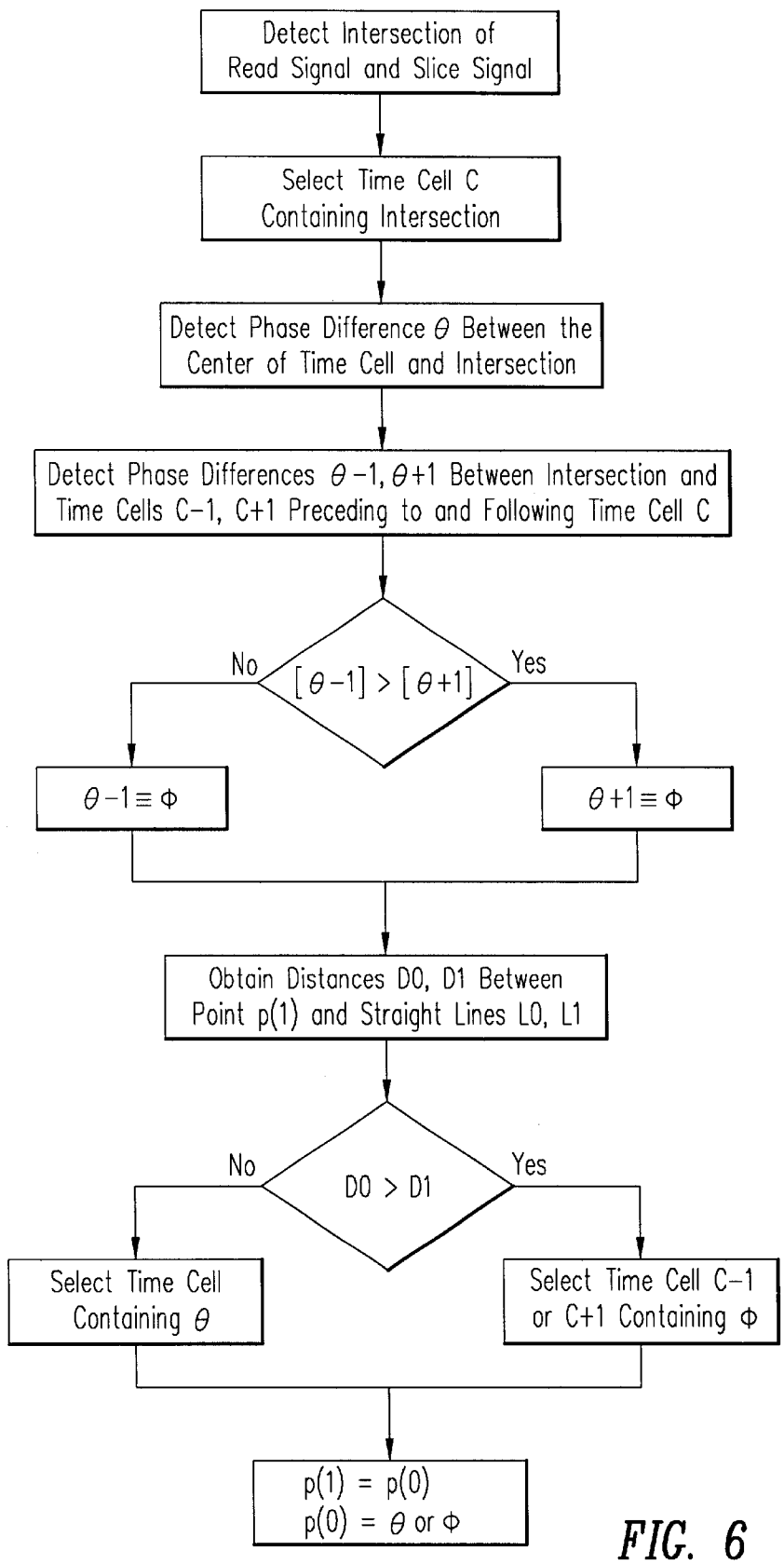
FIG. 6 shows a flow of the method of this invention.

A flow chart of the above described embodiment is shown in FIG. 6. While this embodiment relates to an example where an error is evaluated using a least square method, it may be evaluated by another method.

For example, an average value a of the past selected values p(0), p(1) . . . p(i−1) preceding to the current measurement value p(i) is first obtained. Then, a distance d1 between the average value α and the phase difference "θ" (FIG. 4), and a distance d2 between the average value α and the smaller one φ of the phase differences "θ−1" and "θ+1" (FIG. 4) are obtained. The smaller one of the distances D1 and d2 is then selected as a probable phase difference. A time cell containing the selected phase difference is selected as a probable time cell in which an intersection should be contained. Specifically, if d1<d2, the time cell 19 having θ (FIG. 4) is selected as a probable time cell. Conversely, if d1>d2, the time cell 21 having φ (FIG. 4) is selected as a probable time cell. If d1=d2, the time cell 19 having θ is selected.

As another example, a first order function F is first obtained from the past selected values p(0), p(1), p(2). The first order function F is then extrapolated to predict a current measured value β. FIG. 6 shows this process. In FIG. 6, a distance d3 between the measurement value β and the phase difference "θ" and a distance d4 between the measurement value β and the phase difference φ are obtained. The smaller one of the distances d3 and d4 is selected as a probable phase difference. A time cell containing the selected phase difference is selected as a probable time cell in which the intersection should be contained. Specifically, if d3<d4, the time cell 19 having θ (FIG. 4) is selected as a probable time cell. Conversely, if d3>d4, the time cell 21 having φ ("θ+1", in FIG. 4) is selected as a probable time cell. If d3=d4, the time cell having θ is selected.

Figure 8:
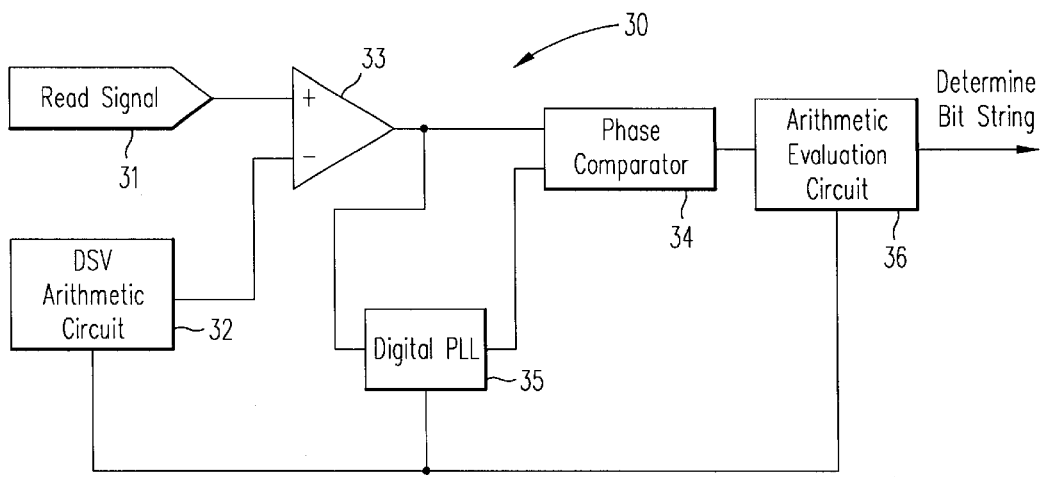
FIG. 8 is a diagram showing an embodiment of a binary digitizing device of this invention.

FIG. 8 is a diagram showing an example of an apparatus for digitizing a signal read from a data storage medium of this invention into a binary value. A binary digitizing device 30 comprises a DSV arithmetic circuit 32, a level comparator 33, a circuit for generating and controlling a time cell (digital PLL) 35, a phase comparator 34 and an arithmetic evaluation circuit 36.

In the apparatus of FIG. 8, the DSV arithmetic circuit 32 generates a slice signal. The level comparator 33 receives a signal 32 read from the data storage medium and the slice signal from the DSV arithmetic circuit 32 to detect an intersection between the read signal and the slice signal. The phase comparator 34 selects a time cell in which the detected intersection is contained and detects the phase difference between the center of the time cell and the intersection. The time cell is feed back controlled by the PLL 35. The arithmetic evaluation circuit 36 evaluates the probability of a time cell in which an intersection is contained using the detected phase difference to select a time cell in which an intersection should be contained. More specific evaluation in the arithmetic evaluation circuit 36 is done by a binary digitizing method using the above described least square method and the like.

As described in the above, this invention allows a probable time cell containing an intersection to be selected by evaluating the phase error of the intersection between the signal read from the data storage medium and the slice signal in more precisely digitizing the signal read from the data storage medium to reproduce correct bit string information and reduce the rate of occurrence of bit error in reproduction.

What is claimed is:

1. A method of digitizing a signal read from a data storage medium into a binary value comprising;
   a step of obtaining a period of a time cell from the frequency of the read signal,
   a step of detecting an intersection between the read signal and a slice signal,
   a step of selecting a time cell in which said intersection is contained,
   a step of evaluating the probability of the selected time cell and re-selecting a time cell in which said intersection should be contained, and
   a step of determining that said re-selected time cell is a bit "1".

2. A method of claim 1 in which said step of evaluating the probability of the time cell and re-selecting a time cell in which said intersection should be contained comprises;
   a step of obtaining a phase difference between the intersection and the center of each of the selected time cell and 2 time cells preceding to and following the selected time cell, and
   a step of evaluating the probability of the selected time cell using the 3 phase differences so obtained to select a time cell which is determined to be the most probable time cell in which an intersection should be contained among said 3 time cells.

3. A method of claim 2 in which said step of evaluating the probability of the selected time cell to select a time cell which is determined to be the most probable time cell comprises;
   a step of obtaining 2 straight lines L0 and L1 using a least square method, where, $L0 = f[p(0), p(1), \theta]$
   $L1 = f[p(0), p(1), \phi],$ and
   $\theta$: phase difference between the intersection and the center of the time cell in which the intersection is detected,
   $\phi$: phase difference $\theta-1$ or $\theta+1$ between the intersection and the center of each of the 2 time cells preceding to or following the time cell in which the intersection is detected, whichever the smallest in absolute value,
   $p(0)$: the value preceding to the immediately preceding value (phase difference),
   $p(1)$: the preceding value,
   a step of obtaining the distance D0 between the straight line L0 and $p(1)$ and the distance D1 between the straight line L1 and $p(1)$,
   a step of selecting the smaller one of D0 and D1 as a probable sum, and
   a step of selecting a time cell containing $\theta$ or $\phi$ as a probable time cell in which said intersection is contained based on the selected one of D0 and D1.

4. A method of claim 2 in which said step of evaluating the probability of the selected time cell to select a time cell which is determined to be the most probable time cell comprises;
   a step of obtaining 2 straight lines L0 and L1 using a least square method, where, $L0 = f[p(0), p(1), \theta]$
   $L1 = f[p(0), p(1), \phi],$ and
   $\theta$: phase difference between the intersection and the center of the time cell in which the intersection is detected,
   $\phi$: phase difference $\theta-1$ or $\theta+1$ between the intersection and the center of each of the 2 time cells preceding to or following the time cell in which the intersection is detected, whichever the smallest in absolute value,
   $p(0)$: the value preceding to the immediately preceding value (phase difference),
   $p(1)$: the preceding value,
   a step of obtaining the sum A0 of the distances from the straight line L0 to $p(0)$, $p(1)$ and $\theta$, and the sum A1 A0 of the distances from the straight line L0 to $p(0)$, $p(1)$ and $\phi$,
   a step of selecting the smaller one of A0 and A1 as a probable sum, and
   a step of selecting a time cell containing $\theta$ or $\phi$ as a probable time cell in which said intersection should be contained based on the selected one of A0 and A1.

5. A method of claim 2 in which said step of evaluating the probability of the selected time cell to select a time cell which is determined to be the most probable time cell comprises;
   a step of obtaining an average value $\alpha$ of the phase difference selected up to the previous round,
   a step of obtaining a distance d1 from the average value $\alpha$ to the phase difference $\theta$ between the center of the time cell selected in the present round and said intersection, and a distance d2 from the average value $\alpha$ to smaller one of the phase differences $\theta-1$ and $\theta+1$ between said intersection and the center of each of the 2 time cells preceding to and following the time cell selected in the present round,
   a step of selecting the smaller one of d1 and d2 as a probable distance, and
   a step of selecting a time cell containing $\theta$ or $\phi$ as a probable time cell in which said intersection should be contained based on the selected one of d1 and d2.

6. A method of claim 2 in which said step of evaluating the probability of the selected time cell to select a time cell which is determined to be the most probable time cell comprises;

a step of obtaining a first order function F from the phase differences selected up to the previous round, a step of extrapolating the first order function F to predict a current measured value β, a step of obtaining a distance S1 from the measured value β to the phase difference θ between said intersection and the center of the time cell selected in the present round, and a distance S2 from the measured value β to the smaller one φ of the phase differences θ−1 and θ+1 between said intersection and the center of each of the time cell preceding to and following the time cell selected in the present round, a step of selecting the smaller one of S1 and S2 as a probable distance, and a step of selecting a time cell containing θ or φ as a probable time cell in which said intersection should be contained based on the selected one of S1 and S2.

7. A method of claim 1 in which said data storage medium is selected from the group consisting of a hand disk (HD), a digital video disk (DVD), a magneto-optical disk (MO, a compact disk (CD) and a laser disk (LD).

8. An apparatus for digitizing a signal read from a data storage medium into a binary value comprising;

a circuit for generating a slice signal, a level comparator for slicing the read signal using the slice signal to detect the intersection between the read signal and the slice signal, a circuit for generating and controlling a time cell, a phase comparator for selecting a time cell in which the detected intersection is contained to detect a phase difference between the center of the time cell and the intersection, and an arithmetic evaluation circuit for evaluating the probability of the time cell in which the intersection is contained using the detected phase difference to select a time cell in which the intersection should be contained.

9. An apparatus of claim 8 in which said arithmetic evaluation circuit obtains a phase difference between the intersection and the center of each of the selected time cell and 2 time cells preceding to and following the selected time cell, and evaluates the probability of the selected time cell using the 3 phase differences so obtained to select a time cell which is determined to be the most probable time cell in which an intersection should be contained among said 3 time cells.

10. An apparatus of claim 9 in which said arithmetic evaluation circuit;

obtains 2 straight lines L0 and L1 using a least square method, where, $L0 = f[p(0), p(1), \theta]$ $L1 = f[p(0), p(1), \phi]$, and θ: phase difference between the intersection and the center of the time cell in which the intersection is detected, φ: phase difference θ−1 or θ+1 between the intersection and the center of each of the 2 time cells preceding to or following the time cell in which the intersection is detected, whichever the smallest in absolute value, p(0): the value preceding to the immediately preceding value (phase difference), p(1): the preceding value, obtains the distance D0 between the straight line L0 and p(1) and the distance D1 between the straight line L1 and p(1), selects the smaller one of D0 and D1 as a probable sum, and selects a time cell containing θ or φ as a probable time cell in which said intersection is contained based on the selected one of D0 and D1.

11. An apparatus of claim 9 in which said arithmetic evaluation circuit;

obtains 2 straight lines L0 and L1 using a least square method, where, $L0 = f[p(0), p(1), \theta]$ $L1 = f[p(0), p(1), \phi]$, and θ: phase difference between the intersection and the center of the time cell in which the intersection is detected, φ: phase difference θ−1 or θ30 1 between the intersection and the center of each of the 2 time cells preceding to or following the time cell in which the intersection is detected, whichever the smallest in absolute value, p(0): the value preceding to the immediately preceding value (phase difference), p(1): the preceding value, obtains the sum AO of the distances from the straight line L0 to p(0), p(1) and θ, and the sum A1 A0 of the distances from the straight line L0 to p(0), p(1) and φ, selects the smaller one of A0 and A1 as a probable sum, and selects a time cell containing θ or φ as a probable time cell in which said intersection should be contained based on the selected one of A0 and A1.

12. An apparatus of claim 9 in which said arithmetic evaluation circuit;

obtains an average value α of the phase difference selected up to the previous round, obtains a distance d1 from the average value α to the phase difference θ between the center of the time cell selected in the present round and said intersection, and a distance d2 from the average value α to smaller one of the phase differences θ−1 and θ30 1 between said intersection and the center of each of the 2 time cells preceding to and following the time cell selected in the present round, selects the smaller one of d1 and d2 as a probable distance, and selects a time cell containing θ or φ as a probable time cell in which said intersection should be contained based on the selected one of d1 and d2.

13. An apparatus of claim 9 in which said arithmetic evaluation circuit;

obtains a first order function F from the phase differences selected up to the previous round, extrapolates the first order function F to predict a current measured value β, obtains a distance S1 from the measured value β to the phase difference θ between said intersection and the center of the time cell selected in the present round, and a distance S2 from the measured value β to the smaller one φ of the phase differences θ−1 and θ+1 between said intersection and the center of each of the time cell preceding to and following the time cell selected in the present round, selects the smaller one of S1 and S2 as a probable distance, and selects a time cell containing θ or φ as a probable time cell in which said intersection should be contained based on the selected one of S1 and S2.

14. An apparatus of claim 8 in which said circuit for generating and controlling said time cell is a digital phase locked loop (PLL) circuit.

15. An apparatus of claim 8 in which said data storage medium is selected from the group consisting of a hand disk (HD), a digital video disk (DVD), a magneto-optical disk (MO, a compact disk (CD) and a laser disk (LD).

\* \* \* \* \*